United States Patent
Veeriah et al.

(10) Patent No.: US 12,526,287 B2
(45) Date of Patent: Jan. 13, 2026

(54) SYSTEM AND METHOD FOR DETECTING UNAUTHORIZED RELOCATION OF ENDPOINT DEVICES

(71) Applicant: Privafy Inc, Burlington, MA (US)

(72) Inventors: Vijay Sankar Veeriah, Bangalore (IN); Srinivasan Krishnamoorthy, Bangalore (IN); Anil Kumar Chaudhury, Bangalore (IN); Rajesh Kumar Sahoo, Bangalore (IN)

(73) Assignee: Privafy Inc

( * ) Notice: Subject to any disclaimer, the term of this patent is extended or adjusted under 35 U.S.C. 154(b) by 25 days.

(21) Appl. No.: 18/884,215

(22) Filed: Sep. 13, 2024

(65) Prior Publication Data

US 2025/0119437 A1 Apr. 10, 2025

Related U.S. Application Data

(60) Provisional application No. 63/589,035, filed on Oct. 10, 2023.

(51) Int. Cl.
*H04L 9/40* (2022.01)

(52) U.S. Cl.
CPC .................. *H04L 63/14* (2013.01)

(58) Field of Classification Search
CPC ...... H04L 63/14; H04L 63/1425; Y02D 30/00
See application file for complete search history.

(56) References Cited

U.S. PATENT DOCUMENTS

| | | | |
|---|---|---|---|
| 7,966,659 B1 | 6/2011 | Wilkinson et al. | |
| 8,000,698 B2 | 8/2011 | Wolman et al. | |
| 10,326,796 B1 | 6/2019 | Varadarajan et al. | |
| 11,212,681 B1 | 12/2021 | Balaramn et al. | |
| 11,539,717 B2 | 12/2022 | Bratspiess et al. | |
| 2005/0193200 A1* | 9/2005 | Akiba | H04N 1/32037 713/168 |
| 2016/0182565 A1 | 6/2016 | Salvador | |
| 2018/0006839 A1* | 1/2018 | Juneau | H04L 63/14 |
| 2022/0376911 A1* | 11/2022 | Ruffino | H04L 9/0897 |

* cited by examiner

*Primary Examiner* — Anh Nguyen
(74) *Attorney, Agent, or Firm* — Jason C. Cameron

(57) ABSTRACT

A system and method for detecting unauthorized relocation of endpoint devices are disclosed. The system comprises one or more network security appliances and one or more servers. The one or more network security appliances is configured to collect network environment data associated with each endpoint device of the one or more endpoint devices. The one or more servers is configured to obtain the network environment data from the one or more network security appliances for generating one or more hash values for the network environment data of each endpoint device of the one or more endpoint devices. The system performs a comparative analysis between the one or more hash values to generate a Paranoia-Diff-Score (PDS) for each endpoint device of the one or more endpoint devices to detect the unauthorized relocation of the one or more endpoint devices.

20 Claims, 5 Drawing Sheets

SYSTEM AND METHOD FOR DETECTING UNAUTHORIZED RELOCATION OF ENDPOINT DEVICES

EARLIEST PRIORITY DATE

This Application claims priority from a Provisional patent application filed in the United States of America having Patent Application No. 63/589,035, filed on Oct. 10, 2023, and titled "SYSTEM AND METHOD FOR DETECTING NETWORK SECURITY APPLIANCE MOVEMENT AND ADAPTIVE CONFIGURATION MANAGEMENT".

TECHNICAL FIELD

Embodiments of the present disclosure relate to network security and intrusion detection systems and more particularly relate to a computer-implemented system and a computer-implemented method for detecting unauthorized relocation of one or more endpoint devices.

BACKGROUND

In recent years, a proliferation of distributed network environments and increasing adoption of cloud-based services have significantly transformed enterprise network architectures. This shift has introduced new challenges in maintaining network security, particularly in managing and monitoring one or more endpoint devices across diverse and often geographically dispersed locations.

Traditional network security approaches have primarily focused on perimeter defense mechanisms, such as firewalls and intrusion detection systems. However, these methods have proven inadequate in addressing a dynamic nature of modern network topologies, especially when dealing with mobile devices and remote work scenarios.

One critical challenge faced by administrators is an unauthorized relocation of the one or more endpoint devices. When the one or more endpoint devices is moved from their designated network segments or physical locations without proper authorization, it leads to several security risks: a) exposure to untrusted networks: the relocated one or more endpoint devices may connect to unsecured or malicious networks, potentially compromising sensitive data, b) bypassing of security controls: the one or more endpoint devices moved to different network segments may circumvent established security policies and access controls, c) difficulty in asset tracking: the unauthorized relocation makes the one or more endpoint devices challenging to maintain an accurate inventory of network assets and their locations, d) increased vulnerability to insider threats: malicious actors within an organization may exploit the one or more endpoint devices relocation to gain unauthorized access to restricted resources.

Existing solutions for detecting the unauthorized relocation of the one or more endpoint devices commonly rely on static Internet Protocol (IP) address mapping or manual audits, which are time-consuming, error-prone, and ineffective in dynamic network environments. Furthermore, the existing solutions typically lack real-time detection capabilities and struggle to differentiate between legitimate the one or more endpoint devices movement and potentially malicious relocations.

Another limitation of current approaches is their inability to adapt to the varying levels of risk associated with different types of unauthorized relocation of the one or more endpoint devices. This one-size-fits-all approach leads to either excessive false positives, overwhelming security teams, or missed detections of critical security events.

Moreover, an increasing complexity of the network topologies, including hybrid cloud environments and software-defined networks, has made it challenging for traditional security tools to maintain an accurate and up-to-date view of the network structure. This lack of visibility hampers the ability to detect and respond to the unauthorized relocation of the one or more endpoint devices.

As networks continue to evolve and become more distributed, there is a pressing need for more sophisticated, adaptive, and automated solutions that can effectively monitor and secure endpoint devices across diverse network environments. Such solutions should be capable of real-time detection, intelligent risk assessment, and rapid response to unauthorized device relocations while minimizing false positives and operational overhead for security teams One existing approach in the technology, a computer-implemented method for providing dynamic security mechanisms for mixed networks, is disclosed. The mixed network includes an Internet of Things (IoT) type device and a non-IoT device. Using a configuration of the mixed network, a deception device type is determined. A second network that includes a deception mechanism corresponding to the deception device type can be determined. A network tunnel from the mixed network to the second network is configured. The network tunnel enables the deception mechanism to be a node on the mixed network, such that the deception mechanism is accessed from the mixed network. The deception mechanism is used to monitor the mixed network for network abnormalities. An action may be taken when the deception mechanism detects an abnormality. This reference discloses the system comprises a cloud module and a plurality of network scan modules. However, the reference does not disclose the method includes a step of detecting malicious or fraudulent movement and placement of a network security appliance in the plurality of network scan modules.

Several technical challenges persist in current network security and intrusion detection systems. In the existing technology, edge appliances are physical devices deployed at the edge of the network. The edge appliances serve various purposes such as networking, security, data processing, or IoT gateway functionalities. The management and control of these edge appliances are handled centrally from a Cloud Saas (Software as a Service) service. The cloud-based management platform provides a unified interface for the administrators to configure, monitor, and control the deployed appliances. In a Security as a Service (SECaaS) architecture with a Software-Defined Wide Area Network (SD-WAN), edge appliances are deployed to enterprises and controlled centrally from the Cloud SaaS service. These appliances are automatically identified and provisioned with configuration and policies from the cloud, making them operational quickly.

The edge appliances form mesh connections with other devices in the network, providing seamless connectivity. However, the ease of deployment and portability of the edge appliances also pose security risks. Rogue users physically carry away the edge devices and connect them to unauthorized networks, potentially leading to data theft and network intrusion. Furthermore, the administrators relocate the edge appliances for various purposes. However, when the edge appliance is moved to a different location, the existing policies configured may no longer be applicable or suitable in new environments. This issue becomes more relevant and higher when the edge appliances are deployed outdoors. In the event of relocation, the appliance remains unaware of the change and continues operating with the previously authenticated credentials. This situation poses a risk as the relocation is a legitimate action or an undetected fraudulent activity. Therefore, both the cloud management system and the edge appliance itself must detect such changes in the network topology to prevent potential abuse or misuse.

Therefore, there is a need for a system to address and overcome the aforementioned issues by effectively monitoring and securing the one or more endpoint devices across diverse network environments.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computer-implemented system for detecting unauthorized relocation of one or more endpoint devices is disclosed.

In an embodiment, the computer-implemented system comprises one or more network security appliances and one or more servers. The one or more network security appliances is operatively positioned in each network environment of one or more network environments. The one or more network security appliances is configured to collect network environment data associated with each endpoint device of the one or more endpoint devices. The network environment data comprises at least one of: Link Layer Discovery Protocol (LLDP) neighbor data, Media Access Control (MAC) addresses, system capability codes, next hop Media Access Control (MAC) addresses, Dynamic Host Configuration Protocol (DHCP) options, Internet Service Provider Internet Protocol (IP) addresses, Internet Control Message Protocol (ICMP) traceroute data, Network Time Protocol (NTP) date and time, time zone information, gateway, and network traffic data. The one or more network security appliances configured to collect the network environment data through at least one of: a) Dynamic Host Configuration Protocol (DHCP) Server on Local Area Network (LAN) interfaces, and b) neighboring Service Set Identifiers (SSIDs), and Wireless Local Area Network (WLAN) Access Point (AP) Media Access Control (MAC) addresses on Wide Area Network (WAN) interfaces.

In another embodiment, the one or more servers is operatively connected to each network security appliance of the one or more network security appliances. The one or more servers comprises one or more hardware processors and a memory unit. The memory unit is operatively connected to the one or more hardware processors. The memory unit comprises a set of computer-readable instructions in form of a plurality of subsystems, configured to be executed by the one or more hardware processors. The plurality of subsystems comprises a data-obtaining subsystem, a data processing subsystem, a topology detection subsystem, a data analyzing subsystem, a risk score evaluation subsystem, an alert generation subsystem, and a risk validation subsystem.

In yet another embodiment, the data-obtaining subsystem is configured to obtain the network environment data from the one or more network security appliances for storing in one or more databases.

In another embodiment, the data processing subsystem is configured to extract at least one of: one or more baseline network features and one or more real-time network features by parsing the obtained network environment data into one or more tokens. The data processing subsystem is configured to generate the one or more baseline network features during an initial configuration of the one or more network security appliances by collecting the network environment data over a predefined time interval. The predefined time interval for generating the one or more baseline network features ranges between 30 minutes to 2 hours after the initial configuration of the one or more network security appliances. The data processing subsystem is configured to parse the obtained network environment data into the one or more tokens by analyzing the network traffic data. The network traffic data comprises at least one of: Transmission Control Protocol (TCP) payload prefixes, intranet domain names, and Secure Sockets Layer (SSL) server names.

In yet another embodiment, the topology detection subsystem is configured to generate one or more hash values based on at least one of the: one or more baseline network features and one or more real-time network features to determine a network topology of each endpoint device of the one or more endpoint devices. The topology detection subsystem is configured with one or more cryptographic hash function models. The one or more cryptographic hash function models is configured to convert the network environment data into a fixed-size string of characters to generate the one or more hash values for at least one of the: one or more baseline network features and one or more real-time network features.

In another embodiment, the data analyzing subsystem is configured to perform a comparative analysis between the one or more hash values of the one or more baseline network features with the one or more hash values of the one or more real-time network features to generate a Paranoia-Diff-Score (PDS) for each endpoint device of the one or more endpoint devices using one or more machine learning (ML) models. The one or more machine learning (ML) models is selected from a group that comprises at least one of a: Principal Component Analysis (PCA) and one or more autoencoders to generate the Paranoia-Diff-Score (PDS).

In yet another embodiment, the risk score evaluation subsystem is configured to compare the Paranoia-Diff-Score (PDS) against a predefined threshold score for detecting a severity level associated with the unauthorized relocation of each endpoint device of the one or more endpoint devices. The risk score evaluation subsystem is configured to classify the severity level into at least one of a: default paranoia level, moderate paranoia level, and maximum paranoia level, based on the comparison between the Paranoia-Diff-Score (PDS) and the predefined threshold score.

In another embodiment, the computer-implemented system is configured to cease one or more network activities of the one or more endpoint devices if the Paranoia-Diff-Score (PDS) is classified as at least one of the: moderate paranoia level, and maximum paranoia level. The one or more network activities comprises at least one of: a) suspending network traffic of the one or more endpoint devices, b) disabling a network interface of the one or more endpoint devices, c) removing the one or more endpoint devices from any site-to-site virtual private network (VPN) connections, d) terminating one or more active network sessions associated with the one or more endpoint devices, and e) rejecting one or more incoming network connections to the one or more endpoint devices.

In yet another embodiment, the alert generation subsystem is configured to generate one or more alerts based on the Paranoia-Diff-Score (PDS) to notify one or more users about the unauthorized relocation of the one or more endpoint devices. The risk validation subsystem is configured to obtain confirmation data from the one or more users about the unauthorized relocation of the one or more endpoint devices if the Paranoia-Diff-Score (PDS) is classified as at least one of the: default paranoia level and moderate paranoia level. Further, the computer-implemented system is configured to utilize source IP-based geolocation information to optimize the detection of unauthorized relocation of the one or more endpoint devices.

In accordance with another embodiment of the present disclosure, a computer-implemented method for detecting unauthorized relocation of one or more endpoint devices is disclosed. In the first step, the computer-implemented method includes collecting, by the one or more network security appliances, the network environment data associated with each endpoint device of the one or more endpoint devices. In the next step, the computer-implemented method includes obtaining, by the one or more servers through the data processing subsystem, the network environment data from the one or more network security appliances to store in the one or more databases. In the next step, the computer-implemented method includes extracting, by the one or more servers through the data processing subsystem, at least one of the: one or more baseline network features and one or more real-time network features by parsing the obtained network environment data into the one or more tokens. In the next step, the computer-implemented method includes generating, by the one or more servers through the topology detection subsystem, the one or more hash values based on at least one of the: one or more baseline network features and one or more real-time network features to determine the network topology of each endpoint device of the one or more endpoint devices.

In the next step, the computer-implemented method includes performing, by the one or more servers through the data analyzing subsystem, the comparative analysis between the one or more hash values of the one or more baseline network features with the one or more hash values of the one or more real-time network features to generate the Paranoia-Diff-Score (PDS) for each endpoint device of the one or more endpoint devices using the one or more machine learning (ML) models. In the next step, the computer-implemented method includes comparing, by the one or more servers through the risk score evaluation subsystem, the generated Paranoia-Diff-Score (PDS) against the predefined threshold score for detecting the severity level associated with the unauthorized relocation of each endpoint device of the one or more endpoint devices.

In accordance with another embodiment of the present disclosure, a non-transitory computer-readable storage medium storing computer-executable instructions that, when executed by the one or more servers, cause the one or more servers to perform operations for detecting the unauthorized relocation of the one or more endpoint devices. The operations comprises a) collecting the network environment data associated with each endpoint device of the one or more endpoint devices, b) obtaining the network environment data from the one or more network security appliances for storing in the one or more databases, c) extracting at least one of the: one or more baseline network features and one or more real-time network features by parsing the obtained network environment data into the one or more tokens, d) generating the one or more hash values based on at least one of the: one or more baseline network features and one or more real-time network features to determine the network topology of each endpoint device of the one or more endpoint devices, e) performing the comparative analysis between the one or more hash values of the one or more baseline network features with the one or more hash values of the one or more real-time network features to generate the Paranoia-Diff-Score (PDS) for each endpoint device of the one or more endpoint devices using the one or more machine learning (ML) models, and f) comparing the generated Paranoia-Diff-Score (PDS) against the predefined threshold score for detecting the severity level associated with the unauthorized relocation of each endpoint device of the one or more endpoint devices.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
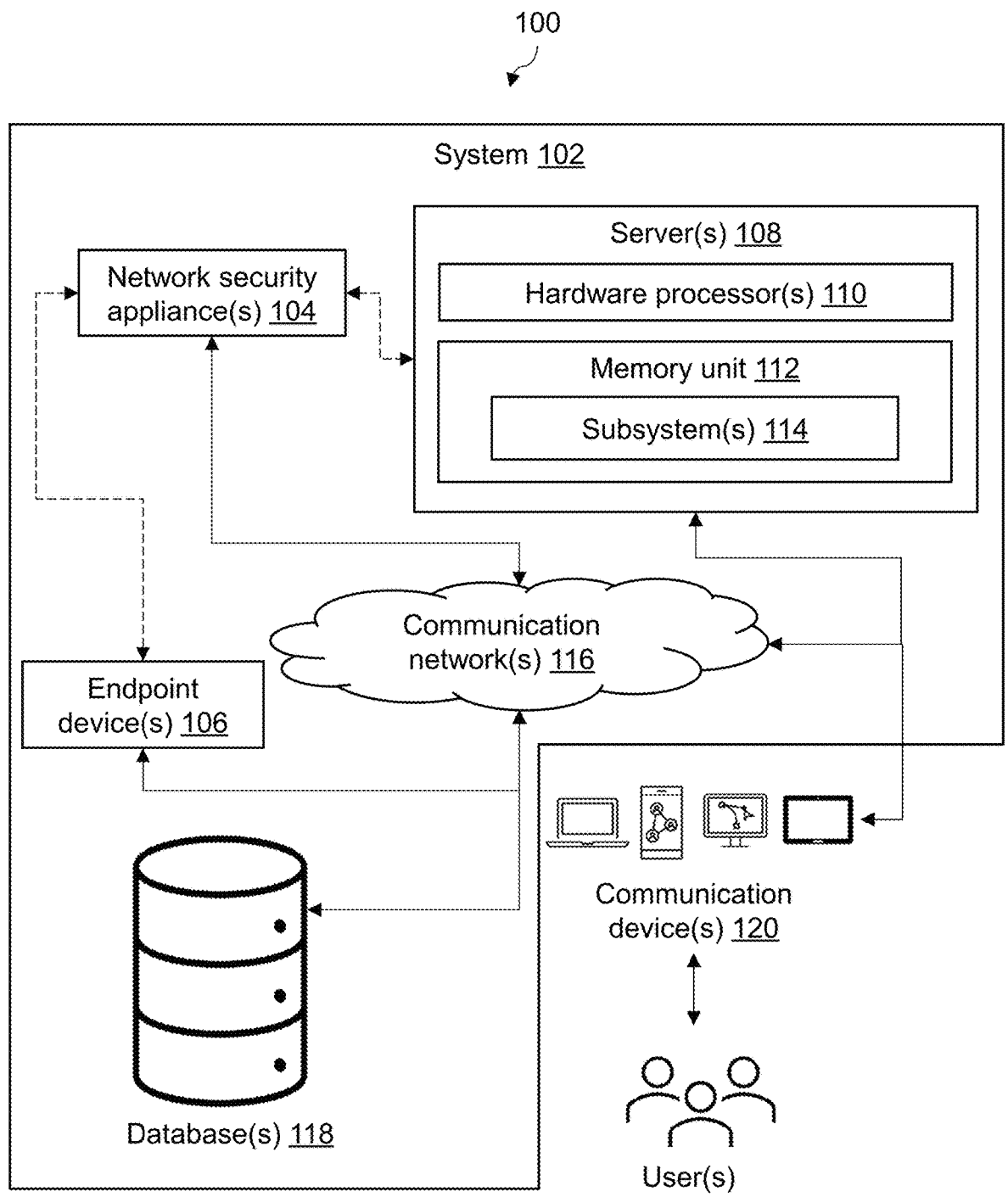
FIG. 1 illustrates an exemplary block diagram representation of a network architecture depicting a computer-implemented system for detecting unauthorized relocation of one or more endpoint devices, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 4, where similar reference characters denote corresponding features consistently throughout the figures, there are shown preferred embodiments, and these embodiments are described in the context of the following exemplary system and/or method.

FIG. 1 illustrates an exemplary block diagram representation of a network architecture 100 depicting a computer-implemented system 102 for detecting unauthorized relocation of one or more endpoint devices 106, in accordance with an embodiment of the present disclosure.

According to an exemplary embodiment of the present disclosure, the network architecture 100 may include the computer-implemented system 102, one or more network security appliances 104, the one or more endpoint devices 106, one or more servers 108, one or more databases 118, and one or more communication devices 120. The computer-implemented system 102, the one or more network security appliances 104, the one or more endpoint devices 106, the one or more servers 108, the one or more databases 118, and the one or more communication devices 120 may be communicatively coupled via one or more communication networks 116, ensuring seamless data transmission, processing, and decision-making. The computer-implemented system 102 acts as the central processing unit within the network architecture 100, responsible for aggregating, analyzing, and responding to data collected by the one or more network security appliances 104. The computer-implemented system 102 is configured to execute a set of computer-readable instructions that control a plurality of subsystems 114, enabling the detection of anomalies such as the detection of the unauthorized relocation of the one or more endpoint devices 106.

In an exemplary embodiment, the one or more network security appliances 104 is a hardware device configured to monitor, control, and protect the one or more endpoint devices 106. The one or more network security appliances 104 is strategically positioned within each network environment of one or more network environments to collect comprehensive network environment data associated with each endpoint device 106 of the one or more endpoint devices 106. The one or more network security appliances 104 are capable of performing deep packet inspection, traffic analysis, and real-time monitoring of network activities. Each network security appliance 104 of the one or more network security appliances 104 is equipped with multiple network interfaces, including at least one of: one or more Local Area Network (LAN) ports and one or more Wireless Local Area Network (WLAN) ports, to facilitate seamless integration into various network topologies.

In another exemplary embodiment, the one or more network environments refer to the various types of network infrastructures in which the computer-implemented system 102 and the one or more network security appliances 104 are deployed. The one or more network environments comprises, but not limited to, at least one of: Enterprise Networks, Cloud-Based Networks, Industrial Control Systems (ICS) Networks, Supervisory Control and Data Acquisition (SCADA) Networks, Office/Home Networks, Data Center Networks, Campus Networks, Educational Networks, and the like. The one or more network environments connect the one or more endpoint devices 106 across multiple departments, locations, and branches.

In an exemplary embodiment, the one or more network security appliances 104 needs to be activated by one or more users within the one or more network environments through an administration platform. Upon logging into the administrative platform, the one or more users is required to input a unique identification number associated with each network security appliance 104 to initiate an activation process. Following activation within the administrative platform, the one or more network security appliances 104 is required to reboot and establish a connection with the associated network environment of the one or more network environments. The administration platform is further configured to display an Internet Protocol (IP) address and physical location of the one or more network security appliances 104. This information is used to prompt the one or more users to provide validation data, enabling the one or more network security appliances 104 to establish a secure connection with the one or more servers 108.

In an exemplary embodiment, the one or more network security appliances 104 is configured to collect the network environment data associated with each endpoint device 106 of the one or more endpoint devices 106 by utilizing advanced data collection mechanisms. The network environment data comprises at least one of: Link Layer Discovery Protocol (LLDP) neighbor data, Media Access Control (MAC) addresses, system capability codes, next hop Media Access Control (MAC) addresses, Dynamic Host Configuration Protocol (DHCP) options, Internet Service Provider Internet Protocol (IP) addresses, Internet Control Message Protocol (ICMP) traceroute data, Network Time Protocol (NTP) date and time, time zone information, gateway, and network traffic data.

In an exemplary embodiment, the one or more network security appliances 104 is specifically configured to support multiple 1 gigabyte (GB) Ethernet ports (both copper and fiber), Peripheral Component Interconnect Express Generation 3.0 (PCIe Gen. 3), Serial Advanced Technology Attachment (SATA) 3.0, Universal Serial Bus (USB) 2.0, USB 3.0 and Next Generation Form Factor (NGFF) interfaces, providing an ideal combination for enterprise and service provider networking, security, and industrial applications.

In an exemplary embodiment, each network security appliance 104 of the one or more network security appliances 104 is equipped with up to 32 GB random access memory (RAM) memory, supporting double-bit error detection and single-bit error correction Error Correction Code (ECC). The one or more network security appliances 104 includes two 260-pin Double Data Rate Fourth Generation Synchronous Dynamic Random-Access Memory (DDR4) 2400/2133/1866 MHz slots and one 2.5-inch slot for solid-state drives (SSDs)/hard disk drives (HDDs) storage options. This configuration ensures ample processing power and storage capacity for handling complex network monitoring and analysis tasks. For network connectivity, each network security appliance 104 of the one or more network security appliances 104 features six Serial gigabit media-independent interface (SGMII) 1Ge PHYs (2× i350 with Single Root Input/Output Virtualization (SRIOV)) and two 1Ge Small Form-factor Pluggable (SFP+) modules, allowing for flexible deployment in various network topologies. The multiple network interfaces enable each network security appliance 104 of the one or more network security appliances 104 to collect the network environment data.

The one or more network security appliances 104 is configured to collect the network environment data through Dynamic Host Configuration Protocol (DHCP) Server on Local Area Network (LAN) interfaces. On the other hand, the one or more network security appliances 104 is configured to collect the network environment data through neighboring Service Set Identifiers (SSIDs), and Wireless Local Area Network (WLAN) Access Point (AP) Media Access Control (MAC) addresses on Wide Area Network (WAN) interfaces.

In an exemplary embodiment, the one or more endpoint devices 106 may be, but not limited to, the one or more communication devices 120, the one or more servers 108, and one or more networking devices, repeaters, firewall devices, network devices, the one or more databases 118, network attached storage devices, assets, machinery, instruments, facility equipment, emergency management devices, image capturing devices, any other devices, and combination thereof. The one or more communication devices 120 may include, but is not limited to, a mobile device, a smartphone, a Personal Digital Assistant (PDA), a tablet computer, a phablet computer, a wearable computing device, a Virtual Reality/Augmented Reality (VR/AR) device, a laptop, a desktop, and the like. The one or more networking devices comprises, but not limited to, routers, network hubs, modems, firewalls, wireless access points (WPS), network bridges, network switches, network interface cards (NIC), and the like.

In an exemplary embodiment, the one or more endpoint devices 106 may be associated with, but not limited to, one or more service providers, one or more customers, an individual, an administrator, a vendor, a technician, a worker, a specialist, an instructor, a supervisor, a team, an entity, an organization, a company, a facility, a bot, any other user, and combination thereof. The entities, the organization, and the facility may include, but not limited to, an e-commerce company, online marketplaces, service providers, retail stores, a merchant organization, a logistics company, warehouses, transportation company, an airline company, a hotel booking company, a hospital, a healthcare facility, an exercise facility, a laboratory facility, a company, an outlet, a manufacturing unit, an enterprise, an organization, an educational institution, a secured facility, a warehouse facility, a supply chain facility, any other facility/organization and the like.

In an exemplary embodiment, the one or more servers 108 may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or one or more hardware processors 110. The one or more servers 108 is operatively connected to each network security appliance 104 of the one or more network security appliances 104. The one or more servers 108 comprises the one or more hardware processors 110 and a memory unit 112. The memory unit 112 is operatively connected to the one or more hardware processors 110. The memory unit 112 comprises a set of computer-readable instructions in form of the plurality of subsystems 114, configured to be executed by the one or more hardware processors 110.

The one or more hardware processors 110 may include, for example, microprocessors, microcomputers, microcontrollers, digital signal processors, central processing units, state machines, logic circuits, and/or any devices that manipulate data or signals based on operational instructions. Among other capabilities, the one or more hardware processors 110 may fetch and execute computer-readable instructions in the memory unit 112 operationally coupled with the computer-implemented system 102 for performing tasks such as data processing, input/output processing, and/or any other functions. Any reference to a task in the present disclosure may refer to an operation being or that may be performed on data. The one or more hardware processors 110 is high-performance processors capable of handling large volumes of data and complex computations. The one or more hardware processors 110 may be, but not limited to, at least one of: multi-core central processing units (CPU), graphics processing units (GPUs), and specialized Artificial Intelligence (AI) accelerators that enhance an ability of the computer-implemented system 102 to process real-time data from one or more sources simultaneously.

In an exemplary embodiment, the one or more databases 118 may configured to store, and manage data related to various aspects of the computer-implemented system 102. The one or more databases 118 may store at least one of: the network environment data, one or more baseline network features, one or more real-time network features, one or more hash values, Paranoia-Diff-Scores (PDSs), and other relevant information generated by the computer-implemented system 102. The one or more databases 118 may include different types of databases such as relational databases (e.g., Structured Query Language (SQL) databases), non-Structured Query Language (NoSQL) databases (e.g., MongoDB, Cassandra), time-series databases (e.g., InfluxDB), an OpenSearch database, and object storage systems (e.g., Amazon S3, PostgresDB). The relational databases may be used to store structured data comprising, but not limited to, logs, event details, and metadata. The NoSQL databases may be employed to store unstructured and semi-structured data such as user activity data, network traffic details, and application behavior logs. The time-series databases are ideal for storing time-stamped data, such as process activities, network connections, and other time-dependent events. The object storage systems may be utilized for storing large volumes of binary data, including files from one or more machine learning models. Additionally, the one or more databases 118 may implement advanced indexing, partitioning, and replication techniques to ensure high availability, scalability, and quick access to the data. The one or more databases 118 may also support various security features such as encryption, access control, and regular backups to protect sensitive information and ensure a data integrity within the computer-implemented system 102.

In an exemplary embodiment, the one or more communication devices 120 may provide real-time updates and one or more alerts regarding status of the one or more endpoint devices 106. The real-time updates and the one or more alerts may include notifications about the detection of the unauthorized relocation of the one or more endpoint devices 106, changes in the PDS, and potential security threats identified by the one or more network security appliances 104. The one or more communication devices 120 are further configured to deliver these one or more alerts through multiple channels, such as email, Short Message Service (SMS), or a dedicated monitoring dashboard, enabling the one or more users and one or more administrators to take immediate action to mitigate any detected risks.

In an exemplary embodiment, the one or more communication networks 116 may be, but not limited to, a wired communication network and/or a wireless communication network, a local area network (LAN), a wide area network (WAN), a Wireless Local Area Network (WLAN), a metropolitan area network (MAN), a telephone network, such as the Public Switched Telephone Network (PSTN) or a cellular network, an intranet, the Internet, a fiber optic network, a satellite network, a cloud computing network, or a combination of networks. The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including fourth generation (4G) technologies and fifth generation (5G) technologies), Bluetooth, ZigBee, long-range wide area network (LoRaWAN), satellite communication, radio frequency identification (RFID), 6G (sixth generation) networks, advanced IoT protocols, mesh networks, non-terrestrial networks (NTNs), near field communication (NFC), and the like.

In an exemplary embodiment, the computer-implemented system 102 may be implemented by way of a single device or a combination of multiple devices that may be operatively connected or networked together. The computer-implemented system 102 may be implemented in hardware or a suitable combination of hardware and software.

Though few components and the plurality of subsystems 114 are disclosed in FIG. 1, there may be additional components and subsystems which is not shown, such as, but not limited to, ports, routers, repeaters, firewall devices, network devices, the one or more databases 118, network attached storage devices, assets, machinery, instruments, facility equipment, emergency management devices, image capturing devices, any other devices, and combination thereof. The person skilled in the art should not be limiting the components/subsystems shown in FIG. 1. Although FIG. 1 illustrates the computer-implemented system 102, and the one or more communication devices 120 connected to the one or more databases 118, one skilled in the art can envision that the computer-implemented system 102, and the one or more communication devices 120 may be connected to several user devices located at various locations and several databases via the one or more communication networks 116.

Those of ordinary skilled in the art will appreciate that the hardware depicted in FIG. 1 may vary for particular implementations. For example, other peripheral devices such as an optical disk drive and the like, the local area network (LAN), the wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the computer-implemented system 102 as is unique to the present disclosure or necessary for an understanding of the present disclosure is depicted and described. The remainder of the construction and operation of the computer-implemented system 102 may conform to any of the various current implementations and practices that were known in the art.

Figure 2:
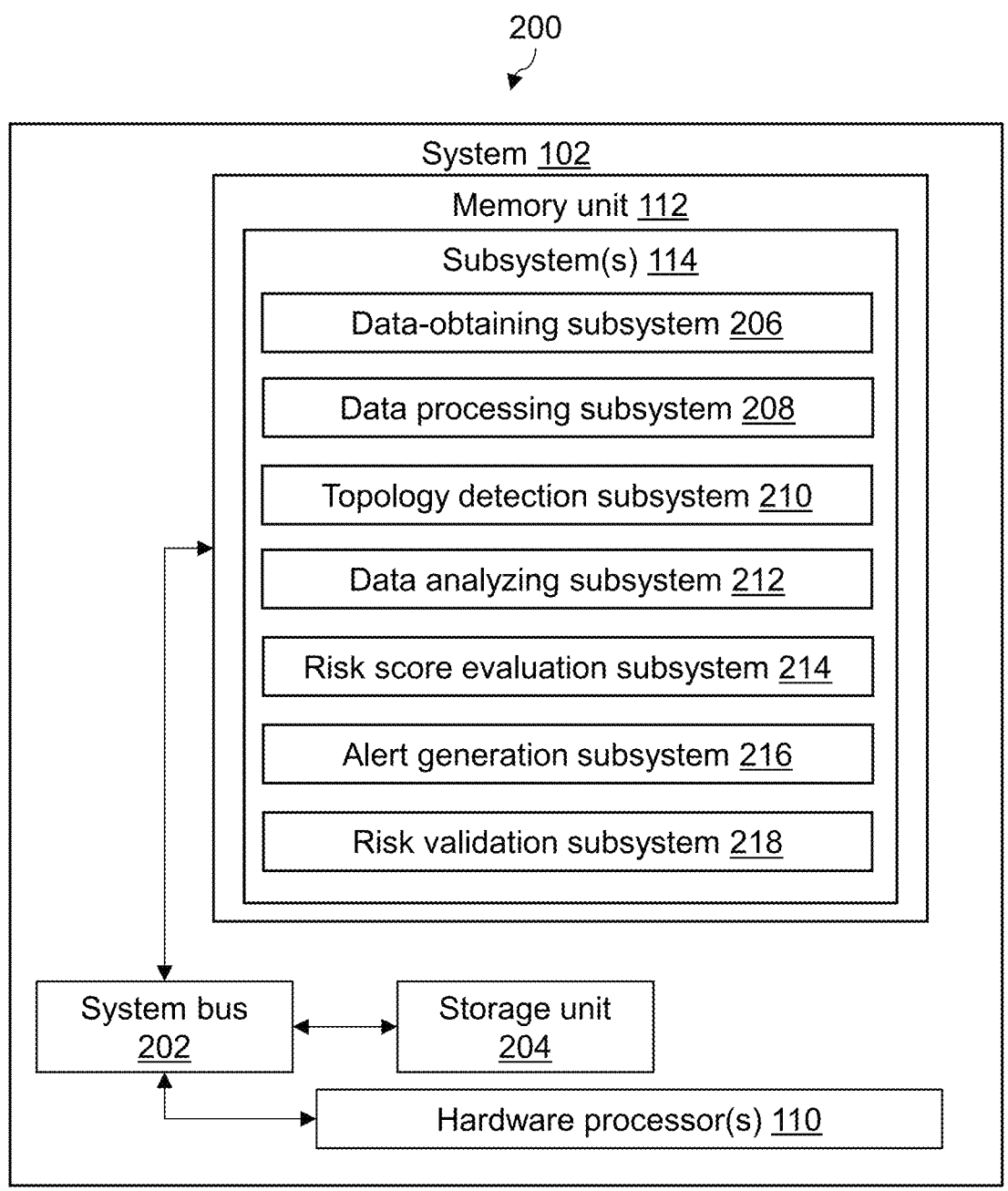
FIG. 2 illustrates an exemplary block diagram representation of the computer-implemented system for detecting unauthorized relocation of the one or more endpoint devices, in accordance with an embodiment of the present disclosure.

FIG. 2 illustrates an exemplary block diagram representation 200 of the computer-implemented system 102 for detecting unauthorized relocation of the one or more endpoint devices 106, in accordance with an embodiment of the present disclosure.

In an exemplary embodiment, the computer-implemented system 102 (hereinafter referred to as the system 102) comprises the one or more servers 108, the memory unit 112, and a storage unit 204. The one or more hardware processors 110, the memory unit 112, and the storage unit 204 are communicatively coupled through a system bus 202 or any similar mechanism. The system bus 202 functions as the central conduit for data transfer and communication between the one or more hardware processors 110, the memory unit 112, and the storage unit 204. The system bus 202 facilitates the efficient exchange of information and instructions, enabling the coordinated operation of the system 102. The system bus 202 may be implemented using various technologies, including but not limited to, parallel buses, serial buses, or high-speed data transfer interfaces such as, but not limited to, at least one of a: universal serial bus (USB), peripheral component interconnect express (PCIe), and similar standards.

In an exemplary embodiment, the memory unit 112 is operatively connected to the one or more hardware processors 110. The memory unit 112 comprises the plurality of subsystems 114 in the form of programmable instructions executable by the one or more hardware processors 110. The plurality of subsystems 114 comprises a data-obtaining subsystem 206, a data processing subsystem 208, a topology detection subsystem 210, a data analyzing subsystem 212, a risk score evaluation subsystem 214, an alert generation subsystem 216, and a risk validation subsystem 218. The one or more hardware processors 110 associated within the one or more servers 108, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, such as generic or programmable logic devices or arrays, application-specific integrated circuits, single-chip computers, and the like.

The memory unit 112 may be the non-transitory volatile memory and the non-volatile memory. The memory unit 112 may be coupled to communicate with the one or more hardware processors 110, such as being a computer-readable storage medium. The one or more hardware processors 110 may execute machine-readable instructions and/or source code stored in the memory unit 112. A variety of machine-readable instructions may be stored in and accessed from the memory unit 112. The memory unit 112 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 112 includes the plurality of subsystems 114 stored in the form of machine-readable instructions on any of the above-mentioned storage media and may be in communication with and executed by the one or more hardware processors 110.

The storage unit 204 may be a cloud storage or the one or more databases 118 such as those shown in FIG. 1. The storage unit 204 may store, but not limited to, recommended course of action sequences dynamically generated by the system 102. These action sequences are based on at least one of: data-obtaining, data processing, extracting at least one of the: one or more baseline network features and one or more real-time network features, generating the one or more hash values, generating the Paranoia-Diff-Score (PDS) and the like. The storage unit 204 ensures that the action sequences are readily accessible for analysis and implementation. By storing this information, the system 102 provides data related to the detection of the unauthorized relocation of the one or more endpoint devices 106 to the one or more users and the administrators for taking appropriate actions. The storage unit 204 may also store historical data related to network topologies, previous PDS scores, logs of network activities, and any prior alerts or notifications. Additionally, the storage unit 204 can retain configuration settings, user preferences, and security policies, ensuring that the system 102 operates consistently and in alignment with organizational security protocols. The storage unit 204 may be any kind of database such as, but not limited to, relational databases, dedicated databases, dynamic databases, monetized databases, scalable databases, cloud databases, distributed databases, any other databases, and a combination thereof.

In an exemplary embodiment, the data-obtaining subsystem 206 is configured to obtain the network environment data from the one or more network security appliances 104 deployed across each network environment of the one or more network environments. The network environment data encompasses a broad spectrum of information critical to detect the unauthorized relocation of the one or more endpoint devices 106. The network environment data may include, but not limited to, metadata related to network traffic, configuration settings, endpoint device identifiers, routing information, neighbor device details obtained through protocols such as the Link Layer Discovery Protocol (LLDP), the MAC addresses, the DHCP lease data, the Wi-Fi access point details, and other relevant network parameters. The data-obtaining subsystem 206 operates by establishing a secure communication channel with each network security appliance 104 via the one or more communication networks 116, ensuring that the network environment data is transmitted without interception or tampering. The data-obtaining subsystem 206 is configured to handle data from multiple network security appliances 104 of the one or more network security appliances 104 simultaneously, ensuring that even large-scale networks with numerous endpoint devices 106 of the one or more endpoint devices 106 may be monitored and analyzed in real time. Once the network environment data is obtained, the network environment data is immediately stored in the one or more databases 118. The one or more databases 118 is structured to efficiently organize and index the collected network environment data, allowing for rapid retrieval and analysis during subsequent stages of processing. By obtaining and storing the network environment data, the data-obtaining subsystem 206 is configured to enable the system 102 to monitor network security, detect the unauthorized relocation of the one or more endpoint devices 106, and provide actionable insights to the one or more users.

In an exemplary embodiment, the data processing subsystem 208 is responsible for transforming raw network environment data into actionable insights by extracting and processing network features. Specifically, the data processing subsystem 208 is configured to extract at least one of the: one or more baseline network features and one or more real-time network features by parsing the obtained network environment data into one or more tokens.

During the initial configuration phase of the one or more network security appliances 104, the data processing subsystem 208 undertakes the task of generating the one or more baseline network features. The generation of the one or more baseline network features is conducted over a predefined time interval, which typically ranges from 30 minutes to 2 hours after the initial configuration of the one or more network security appliances 104. This interval is critical, as it allows the system 102 to capture a representative snapshot of the network environment under normal operating conditions, thereby establishing a robust and accurate baseline against which future network behavior can be compared. The one or more real-time network features is dynamic and continuously updated characteristics of the network environment data that is monitored after the initial configuration of the one or more network security appliances 104. The one or more real-time network features represents a current state of the one or more endpoint devices 106 as it operates, capturing the live conditions and behaviors of the network traffic data of the connected one or more endpoint devices 106. Monitoring the one or more real-time features is crucial for detecting any deviations from the established one or more baseline network features, which may indicate the unauthorized activities such as the relocation of the one or more endpoint devices 106 or potential security breaches.

To achieve the detection of the unauthorized relocation of the one or more endpoint devices 106, the data processing subsystem 208 parses the obtained network environment data into the one or more tokens. The parsing of the obtained network environment data involves the detailed analysis of various types of network traffic data that flow through each network security appliance 104. The network traffic data comprises at least one of: Transmission Control Protocol (TCP) payload prefixes, intranet domain names, and Secure Sockets Layer (SSL) server names. These elements are essential in characterizing the communication patterns and data flows within each network environment of the one or more network environments. The data processing subsystem 208 is further configured to parse the obtained network environment data into the one or more tokens representing at least one of: five most frequently observed TCP payload prefixes, five most frequently accessed intranet domain names, and five most frequently observed SSL server names. The data processing subsystem 208 is configured to store the network traffic data in the one or more databases 118 for a time period ranging between 24 hours to 48 hours.

The data processing subsystem 208 examines the initial segments of TCP payloads, which often contain identifiers or patterns that are indicative of specific applications or services. By analyzing these prefixes, the system can identify common traffic patterns and distinguish between different types of network communications. The data processing subsystem 208 tracks the domain names frequently accessed within the intranet, which can indicate the typical internal resources and services utilized by the network. This helps in identifying the normal operational behavior of the network's internal communication. The data processing subsystem 208 also monitors SSL server names to track secure communications within the network. The SSL server names provide insight into the encrypted traffic and may be used to identify key servers and services that are crucial to the network's operations.

In another exemplary embodiment, the system 102 may also use the one or more real-time network features to adapt and learn over time. For instance, if certain patterns in the network traffic are identified as benign but are not present during the initial configuration of the one or more network security appliances 104, the system 102 may update the one or more baseline network features to include these new patterns, thereby improving its accuracy in detecting truly anomalous behavior.

In an exemplary embodiment, the topology detection subsystem 210 is configured to ensure an integrity and security of the one or more network environments by accurately determining the network topology associated with each endpoint device 106 of the one or more endpoint devices 106. The topology detection subsystem 210 accomplishes this by generating the one or more hash values, which serve as unique identifiers or fingerprints for the network topology at any given time. The generated one or more hash values is stored in the PostgresDB against the Appliance identity such as: Serial Number along with a Universally Unique Identifier (UUID).

To achieve the generation of the one or more hash values, the topology detection subsystem 210 is configured to perform with one or more cryptographic hash function models. The one or more cryptographic hash function models are specialized procedures designed to take an input—in this disclosure, the network environment data—and process it into a fixed-size string of characters, known as a hash value. The process of generating the one or more hash values is pivotal because it converts complex network data into a standardized format that may be easily compared and analyzed.

The one or more hash values are generated based on at least one of the: one or more baseline network features and one or more real-time network features. This means that the topology detection subsystem 210 may create the one or more hash values representing the network's configuration of the one or more baseline network features, established during the initial setup phase, and compare it against the one or more hash values generated from the one or more real-time network features that reflect the current state of the network. By analyzing the one or more hash values, the topology detection subsystem 210 may detect any significant deviations or changes in the network topology, which may indicate unauthorized modifications or the relocation of the associated endpoint device 106 of the one or more endpoint devices 106.

Furthermore, the fixed-size string of characters generated by the one or more cryptographic hash function models ensures that even the smallest change in the network environment data will result in a completely different hash value. This property is essential for the reliable detection of changes, as it allows the topology detection subsystem 210 to quickly and efficiently identify discrepancies between the baseline network features and the real-time network features. By employing cryptographic hash function models, the topology detection subsystem 210 enhances the security and integrity of the system 102 by providing a robust mechanism for monitoring and maintaining the network topology. This capability is particularly important in environments where the unauthorized movement of the one or more endpoint devices 106 may pose significant security risks, as the topology detection subsystem 210 may promptly identify such activities and trigger appropriate the one or more alerts or actions.

In an exemplary embodiment, the one or more cryptographic hash function models may comprises, but not limited to, at least one of: Secure Hash Algorithm 256-bit (SHA-256), Message Digest Algorithm 5 (MD5), Secure Hash Algorithm family (SHA-3), and the like. The SHA-256 is configured to produces a 256-bit (32-byte) hash value, typically rendered as a 64-character hexadecimal number. The MD5 generates a 128-bit hash value, often expressed as a 32-character hexadecimal number. The SHA-3 is configured to provide an additional level of security against certain types of attacks.

For instance, consider an endpoint device 106 within the one or more endpoint devices 106 that may be configured and secured within a specific network environment. During the initial setup, the topology detection subsystem 210 generates baseline network features that include various attributes of the network environment-such as local network topology, device configurations, and traffic patterns. This information is then processed through the one or more cryptographic hash function models to generate a baseline hash value. The input is the network environment data (e.g., LLDP neighbors, MAC addresses, system capability codes), consider the one or more cryptographic hash function models is SHA-256. Then the generated baseline hash value may be represented as "6a9f3cba2f9c4bde68e4e4f8a6bdbf678ac8bfb7656a9b234 5cf6db2a14f3a1b". After the initial configuration, the network environment is expected to remain consistent under normal circumstances. However, if the endpoint device 106 is relocated to a different physical or network location without authorization, the network environment around it will change, leading to alterations in the one or more network features. Then the input may be updated network environment data, then the one or more real time hash values may be represented as "b8b2b2a12f9a6f3c4b9e89e8c7f4c9d1a9b7c6f6b2d8a1c9 e3f4a9b7e6d8a9c1". Given that even a small change in the input data results in a drastically different in the one or more hash values, the system 102 may easily detect the unauthorized relocation by recognizing that the real-time hash value diverges from the baseline hash value.

In an exemplary embodiment, the data analyzing subsystem 212 is configured to perform a comparative analysis between the one or more hash values of the one or more baseline network features with the one or more hash values of the one or more real-time network features. This comparative analysis is configured to detect any deviations in the network environment that could indicate unauthorized relocation of each endpoint device 106 within the one or more endpoint devices 106.

The data analyzing subsystem 212 is configured to generate the Paranoia-Diff-Score (PDS) for each endpoint device 106 of the one or more endpoint devices 106 using one or more machine learning (ML) models. The one or more machine learning (ML) models is selected from a group that comprises at least one of a: Principal Component Analysis (PCA) and one or more autoencoders to generate the Paranoia-Diff-Score (PDS).

The PCA is a statistical procedure that transforms the original features (in this case, the network features) into a set of uncorrelated components, known as principal components. The PCA assists in reducing the dimensionality of the data, thus highlighting the key differences between the one or more baseline features and the one or more real-time network features. By projecting the one or more hash values onto these principal components, the PCA may effectively distinguish normal network variations from those that may signify unauthorized relocations. The autoencoders, on the other hand, are a type of neural network designed to learn efficient coding of input data i.e., the network environment data, typically used for anomaly detection. In this context, the autoencoders are trained on the one or more hash values corresponding to the one or more baseline network features. Once trained, these autoencoders are used to encode and then decode the one or more real-time network features. If the one or more real-time features deviate from the one or more baseline network features significantly, the reconstruction error (i.e., the difference between the input and the output of the autoencoder) will be high, indicating a possible unauthorized relocation of the one or more endpoint devices 106.

The Paranoia-Diff-Score (PDS) is then computed based on the results of these one or more ML models. The PDS is a metric that quantifies the level of discrepancy between the one or more baseline network features and one or more real-time network features. A higher PDS indicates a greater likelihood that the endpoint device 106 may be moved or altered without authorization. This score is critical for the subsequent risk assessment and decision-making processes within the system, as it informs the system's 102 response, such as triggering the one or more alerts or enforcing security policies.

In an exemplary embodiment, the risk score evaluation subsystem 214 performs a pivotal role in assessing and interpreting the Paranoia-Diff-Score (PDS) generated by the data analyzing subsystem 212. Specifically, the risk score evaluation subsystem 214 is configured to compare the computed PDS against a predefined threshold score, which serves as a benchmark for identifying abnormal or suspicious deviations in the network environment that might indicate unauthorized relocation of each endpoint device 106 within the one or more endpoint devices 106.

The risk score evaluation subsystem 214 operates by systematically evaluating the PDS for each endpoint device 106. This evaluation process involves determining how significantly the one or more real-time network features deviate from the one or more baseline network features, as reflected by the PDS. The predefined threshold score is established based on empirical data and represents the boundary between expected (normal) and unexpected (potentially unauthorized) network behavior.

Upon comparing the PDS with the predefined threshold, the risk score evaluation subsystem 214 classifies a severity level of the situation into one of several predefined levels of paranoia into at least one of a: default paranoia level, moderate paranoia level, and maximum paranoia level. The default paranoia level is assigned when the PDS is within a range that suggests the current network behavior is consistent with the one or more baseline network features, indicating no significant deviation or low-risk changes. This default paranoia level implies that the network environment is stable, and the endpoint device 106 associated with the PDS is likely still in its original, authorized location. The moderate paranoia level is triggered when the PDS exceeds the default level but remains below the maximum threshold. The PDS in this range suggests that there is a noticeable deviation from the one or more baseline network features, which may indicate that the one or more endpoint devices 106 has been moved or altered. However, the severity of this potential relocation is moderate, warranting further monitoring or a preliminary investigation by the one or more users. Further, the maximum paranoia level is reached when the PDS significantly exceeds the predefined threshold, indicating a substantial deviation from the one or more baseline network features. Such a high PDS suggests a strong likelihood of unauthorized relocation or tampering with the one or more endpoint devices 106. This level triggers immediate security responses, such as alerting the one or more users, initiating automatic security protocols, or even disabling certain network activities to prevent further unauthorized access or data breaches.

In an exemplary embodiment, the system 102 is configured to enforce stringent security measures by ceasing one or more network activities associated with the one or more endpoint devices 106 when the Paranoia-Diff-Score (PDS) classified as at least one of the: moderate paranoia level, and maximum paranoia level. The one or more network activities may be ceased include, but not limited to, at least one of: a) suspending network traffic of the one or more endpoint devices, b) disabling a network interface of the one or more endpoint devices, c) removing the one or more endpoint devices from any site-to-site virtual private network (VPN) connections, d) terminating one or more active network sessions associated with the one or more endpoint devices, and e) rejecting one or more incoming network connections to the one or more endpoint devices.

The system 102 may temporarily halt all data transmission to and from a relocated endpoint device 106 of the one or more endpoint devices 106. This suspension prevents any further data exchange that may be compromised due to unauthorized relocation. The system 102 may disable the physical or virtual network interface of the relocated endpoint device 106 of the one or more endpoint devices 106, effectively severing its connection to the one or more communication networks 116. This action ensures that the relocated endpoint device 106 of the one or more endpoint devices 106 is isolated from the one or more communication networks 116 until it may be verified and reauthorized by the one or more users. If the relocated endpoint device 106 of the one or more endpoint devices 106 is part of a secure VPN connection between different network sites, the system 102 may disconnect the relocated endpoint device 106 of the one or more endpoint devices 106 from the VPN. This action protects the integrity of secure communications and prevents potential unauthorized access to sensitive resources across network sites. The system 102 may forcibly end any ongoing network sessions that the relocated endpoint device 106 of the one or more endpoint devices 106 is part of. This includes terminating user sessions, data transfers, or any other active connections, ensuring that no potentially compromised session remains open. To further secure the one or more communication networks 116 and the one or more endpoint devices 106, the system 102 may block any incoming connection attempts to the relocated endpoint device 106 of the one or more endpoint devices 106. This rejection prevents unauthorized users or processes from establishing new connections to the relocated endpoint device 106 of the one or more endpoint devices 106.

For instance, consider a corporate security system that monitors the one or more endpoint devices 106 (e.g., laptops, smartphones) across multiple office locations. The system 102 calculates the PDS to assess whether the endpoint device 106 within the one or more endpoint devices 106 may relocated in an unauthorized manner. When the endpoint device 106 reconnects to the one or more communication networks 116, the system 102 generates the PDS based on the differences between the one or more baseline network features and the one or more real-time network features. The features might include network parameters like SSID, IP addresses, geolocation, and the like. Let assume, the one or more users in the office my be the administrators set a threshold default paranoia level as 0-20, a threshold moderate paranoia level as 21-60, and a threshold maximum paranoia level as 61-100. Now, the endpoint device 106 connects from its usual location (e.g., the main office or its branch office) might be low, such as 5 (indicating low risk). If the endpoint device 106 reconnects from a cafeteria of the main office, the PDS might increase to 30 due to a different Wi-Fi SSID and IP address, indicating some deviation but within the same office indicates as moderate paranoia level. Further, if the endpoint device 106 connects from a different location like nearby coffee shop, hostel or home, the PDS might spike to 80 or even 95 due to major changes in geolocation and network characteristics.

For instance, in one scenario, the endpoint device 106 connects from a nearby coworking space, the PDS may be 35, that falls under the moderate paranoia level. The system 102 sends a warning to the one or more users and may restrict access to sensitive resources. In another scenario, the endpoint device 106 connects from a hotel Wi-Fi. The PDS may generated as 85, that falls under the maximum paranoia level. The system 102 immediately ceases network activities by suspending network traffic and disconnecting from the VPN, and it alerts the one or more users for further investigation.

In an exemplary embodiment, the alert generation subsystem 216 is configured to generate the one or more alerts based on the Paranoia-Diff-Score (PDS) to notify the one or more users about the unauthorized relocation of the one or more endpoint devices 106. The alert generation subsystem 216 is configured to actively monitor the PDS, which is computed by comparing the one or more hash values of the one or more baseline network features against the one or more hash values of the one or more real-time network features. When the PDS exceeds the predefined threshold score, indicative of the potential unauthorized relocation, the alert generation subsystem 216 triggers the one or more alerts. The one or more alerts is critical for real-time notification and may be customized to suit different security protocols. The one or more alerts may include, but not limited to, at least one of: visual notifications on the dashboard, email notifications, SMS alerts, push notifications to a mobile device, and the like. Additionally, the alert generation subsystem 216 may categorize the alerts based on the severity of the PDS. For instance, a moderate paranoia level might generate a low-priority alert, while a maximum paranoia level would trigger a high-priority alert, ensuring that appropriate security measures are taken immediately. Furthermore, the alert generation subsystem 216 may include functionalities to log these one or more alerts in a central database or audit trail, allowing for post-incident analysis and compliance reporting. The alert generation subsystem 216 may also interface with other security systems to initiate automated responses, such as escalating the issue to a security operations center (SOC) or activating countermeasures like network isolation or endpoint lockdown.

In an exemplary embodiment, the risk validation subsystem 218 is configured to obtain confirmation data from the one or more users regarding the unauthorized relocation of the one or more endpoint devices 106 if the PDS is classified as at least one of the: default paranoia level and moderate paranoia level. The risk validation subsystem 218 serves as an additional layer of security validation, ensuring that the one or more alerts triggered by the system 102 is accurate and reducing the likelihood of false positives. When the PDS is at the default paranoia level or moderate paranoia level, the risk validation subsystem 218 prompts the one or more users to verify whether the detected relocation is authorized. This confirmation data may be collected through various interfaces, such as, but not limited to, at least one of: a web portal, mobile application, email, and the like, allowing the one or more users to quickly validate the status of the one or more endpoint devices 106. The system 102 may require the one or more users to input additional information or approve a pre-set validation form to confirm the relocation event.

Further, the system 102 is configured to enhance the detection of unauthorized relocation of the one or more endpoint devices 106 by utilizing source IP-based geolocation information. This source IP-based geolocation information provides contextual awareness by determining the physical location of the one or more endpoint devices 106 based on their IP addresses. If the source IP geolocation suggests that the one or more endpoint devices 106 is in a location inconsistent with its expected or authorized location, the system 102 may use this information to corroborate or challenge the PDS findings. By integrating source IP-based geolocation information, the system 102 may optimize its detection capabilities, providing more accurate assessments of potential unauthorized relocations. For example, if the PDS indicates a moderate risk but the source IP-based geolocation information shows the endpoint device 106 is within an authorized region, the system 102 may reduce the alert severity or flag it for the one or more user review rather than immediate action. Conversely, if the source IP-based geolocation information places the one or more endpoint devices 106 in a high-risk or unexpected area, the system 102 may escalate the one or more alerts, even if the PDS is not at the maximum paranoia level.

Figure 3:
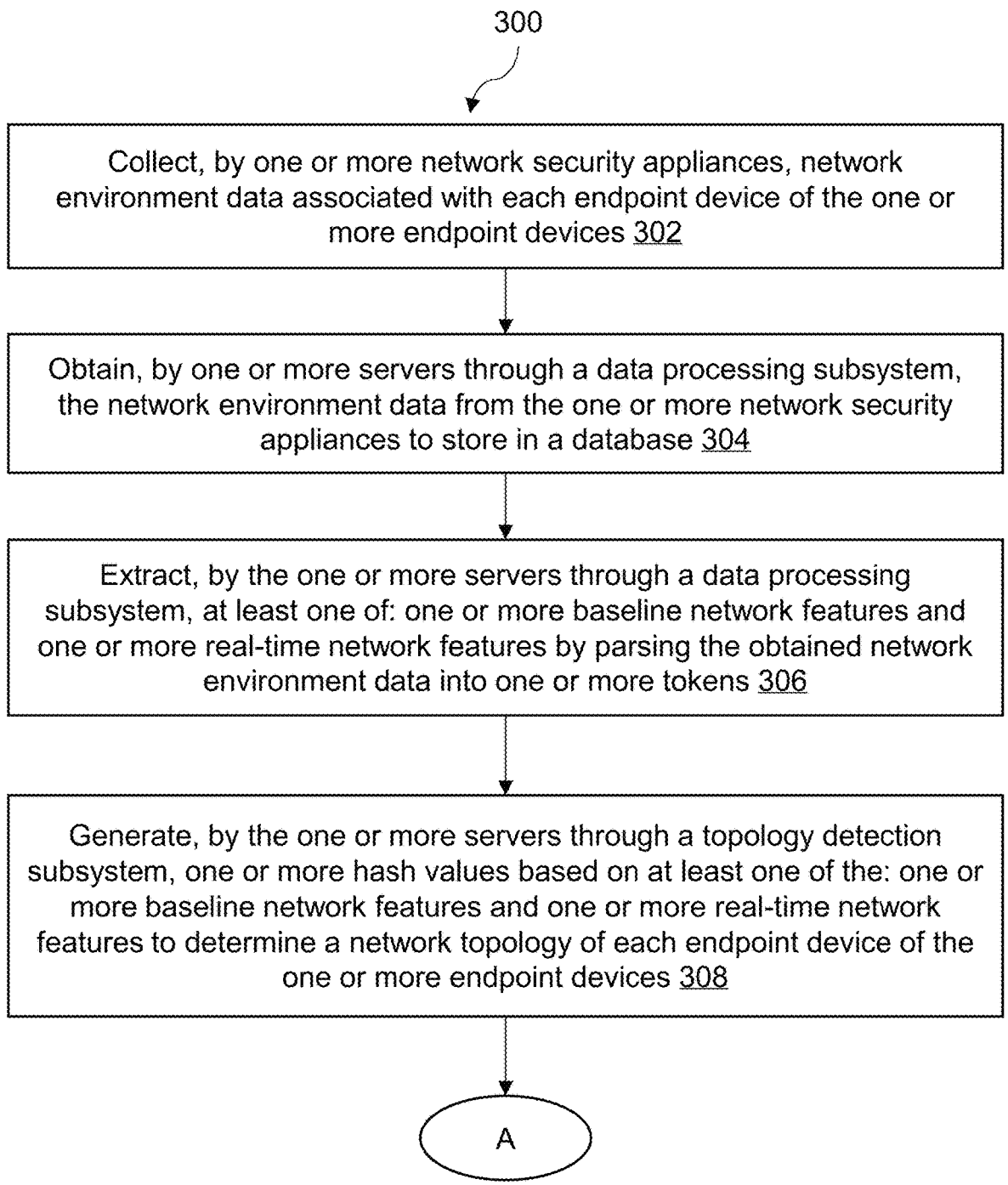
FIG. 3 illustrates an exemplary flow chart of a computer-implemented method for detecting unauthorized relocation of the one or more endpoint devices, in accordance with an embodiment of the present disclosure.
Figure 3:
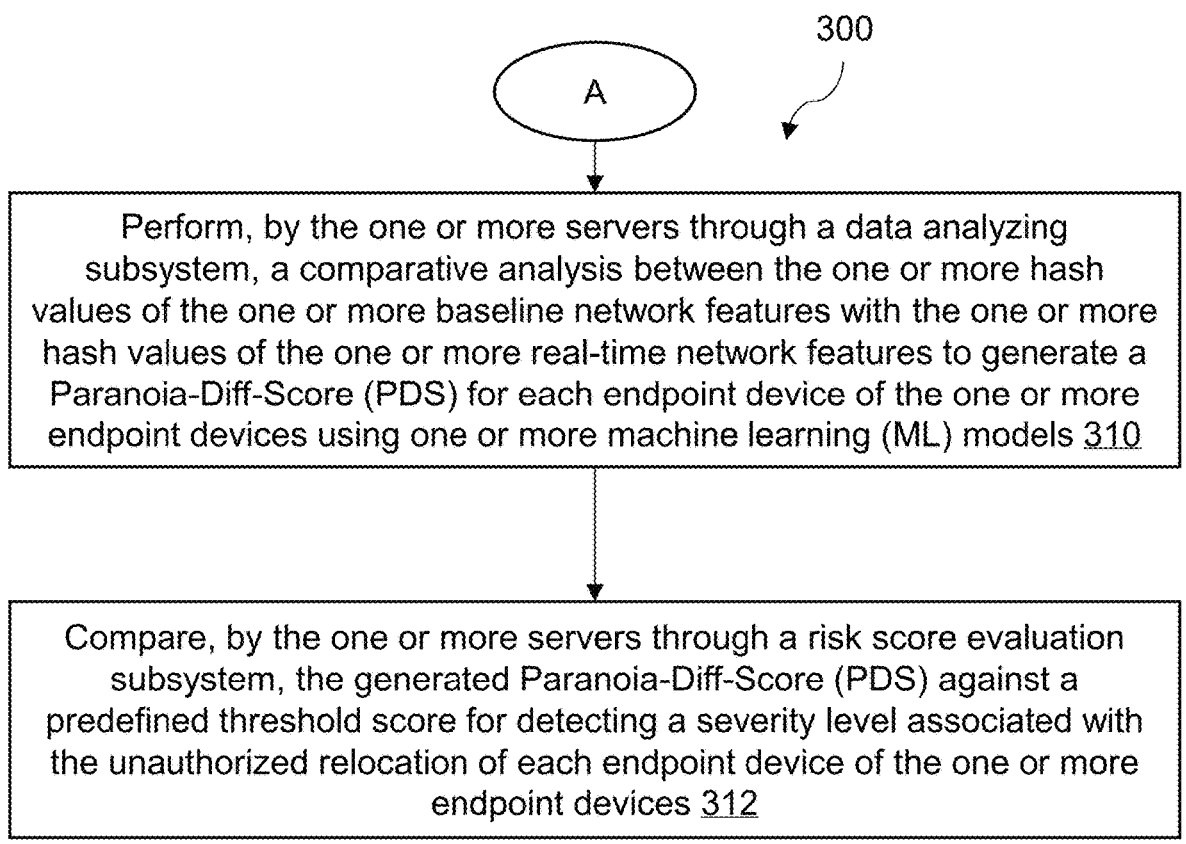

FIG. 3 illustrates an exemplary flow chart of a computer-implemented method 300 for detecting unauthorized relocation of the one or more endpoint devices 106, in accordance with an embodiment of the present disclosure.

In accordance with another exemplary embodiment of the present disclosure, the computer-implemented method 300 for detecting unauthorized relocation of the one or more endpoint devices 106 is disclosed. At step 302, the computer-implemented method 300 includes collecting, by the one or more network security appliances, the network environment data associated with each endpoint device of the one or more endpoint devices. The network environment data comprises, but not limited to, at least one of: Link Layer Discovery Protocol (LLDP) neighbor data, Media Access Control (MAC) addresses, system capability codes, next hop Media Access Control (MAC) addresses, Dynamic Host Configuration Protocol (DHCP) options, Internet Service Provider Internet Protocol (IP) addresses, Internet Control Message Protocol (ICMP) traceroute data, Network Time Protocol (NTP) date and time, time zone information, gateway, network traffic data, and the like. The one or more network security appliances is configured to collect the network environment data through at least one of: Dynamic Host Configuration Protocol (DHCP) Server on Local Area Network (LAN) interfaces, and neighboring Service Set Identifiers (SSIDs), and Wireless Local Area Network (WLAN) Access Point (AP) Media Access Control (MAC) addresses on Wide Area Network (WAN) interfaces.

At step 304, the computer-implemented method 300 includes obtaining, by the one or more servers through the data processing subsystem, the network environment data from the one or more network security appliances to store in the one or more databases. At step 306, the computer-implemented method 300 includes extracting, by the one or more servers through the data processing subsystem, at least one of the: one or more baseline network features and one or more real-time network features by parsing the obtained network environment data into the one or more tokens. The data processing subsystem is configured to generate the one or more baseline network features during the initial configuration of the one or more network security appliances by collecting the network environment data over the predefined time interval. The predefined time interval for generating the one or more baseline network features ranges between 30 minutes to 2 hours after the initial configuration of the one or more network security appliances. The one or more real-time network features are monitored after the initial configuration of the one or more network security appliances. The one or more real-time network features represent the current state of the network as it operates, capturing the live conditions and behaviors of the network traffic and the connected one or more endpoint devices.

At step 308, the computer-implemented method 300 includes generating, by the one or more servers through the topology detection subsystem, the one or more hash values based on at least one of the: one or more baseline network features and one or more real-time network features to determine the network topology of each endpoint device of the one or more endpoint devices. The topology detection subsystem is configured with one or more cryptographic hash function models. The one or more cryptographic hash function models is configured to convert the network environment data into a fixed-size string of characters to generate the one or more hash values for at least one of the: one or more baseline network features and one or more real-time network features.

At step 310, the computer-implemented method 300 performing, by the one or more servers through the data analyzing subsystem, the comparative analysis between the one or more hash values of the one or more baseline network features with the one or more hash values of the one or more real-time network features to generate the Paranoia-Diff-Score (PDS) for each endpoint device of the one or more endpoint devices using the one or more machine learning (ML) models. The one or more machine learning (ML) models is selected from a group that comprises at least one of the: Principal Component Analysis (PCA) and one or more autoencoders to generate the Paranoia-Diff-Score (PDS).

At step 312, the computer-implemented method 300 includes comparing, by the one or more servers through the risk score evaluation subsystem, the generated Paranoia-Diff-Score (PDS) against the predefined threshold score for detecting the severity level associated with the unauthorized relocation of each endpoint device of the one or more endpoint devices. The risk score evaluation subsystem is configured to classify the severity level into at least one of the: default paranoia level, moderate paranoia level, and maximum paranoia level, based on the comparison between the Paranoia-Diff-Score (PDS) and the predefined threshold score.

In the next step, the computer-implemented method 300 includes generating, by the one or more servers through the alert generation subsystem, the one or more alerts based on the Paranoia-Diff-Score (PDS) to notify one or more users about the unauthorized relocation of the one or more endpoint devices. Further, in the next step, the computer-implemented method 300 includes obtaining, by the one or more servers through the risk validation subsystem, confirmation data from the one or more users about the unauthorized relocation of the one or more endpoint devices if the Paranoia-Diff-Score (PDS) is classified as at least one of the: default paranoia level and moderate paranoia level. The computer-implemented method 300 may use the source IP-based geolocation information to optimize the detection of unauthorized relocation of the one or more endpoint devices.

Figure 4:
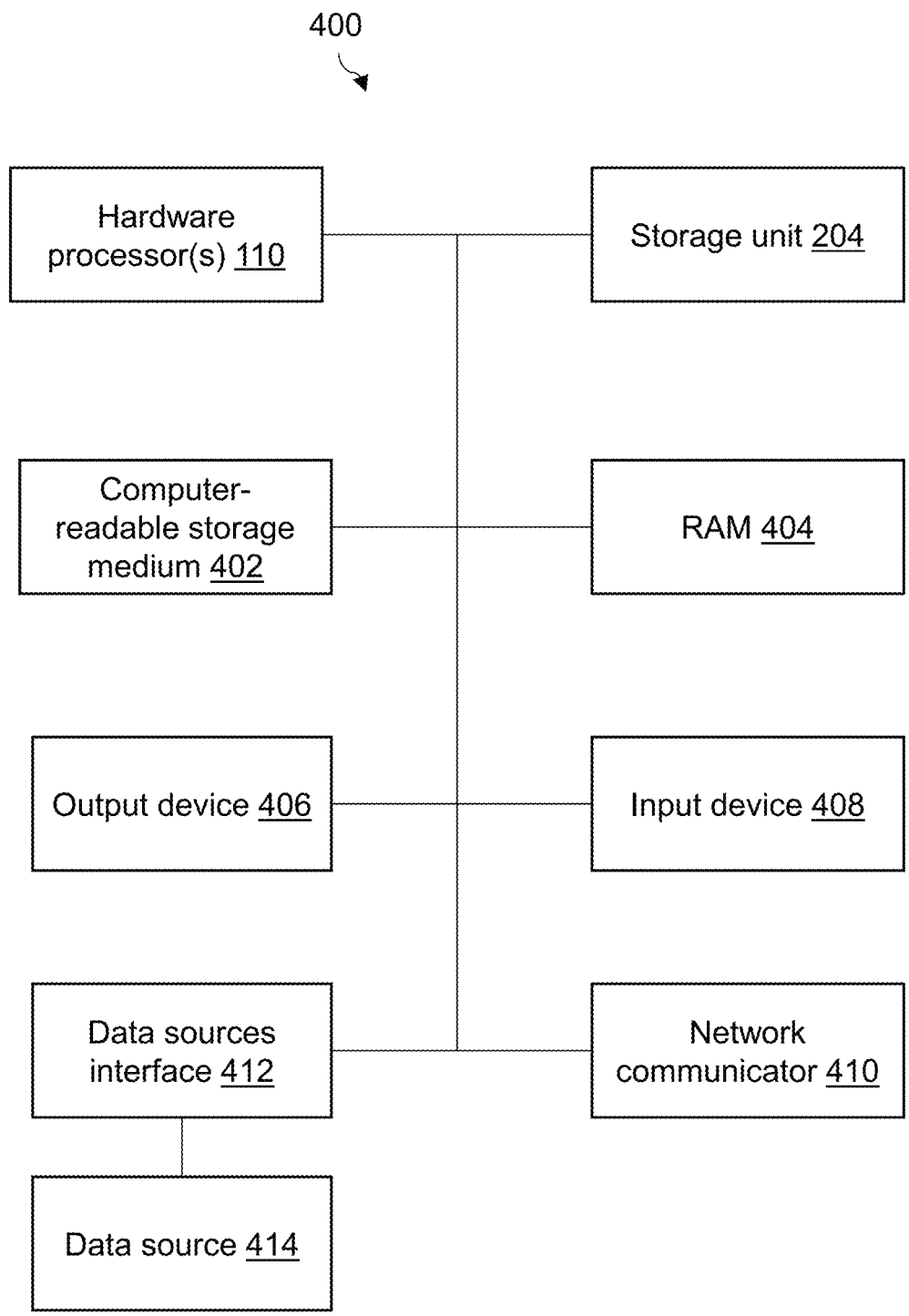
FIG. 4 illustrates an exemplary block diagram representation of a server platform for implementation of the disclosed computer-implemented system, in accordance with an embodiment of the present disclosure.

FIG. 4 illustrates an exemplary block diagram representation of one or more server platforms 400 for implementation of the disclosed computer-implemented system 102, in accordance with an embodiment of the present disclosure.

In an exemplary embodiment, for the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the one or more server platforms 400. As illustrated, the one or more server platforms 400 may include additional components not shown, and some of the components described may be removed and/or modified. For example, a computer system with the multiple graphics processing units (GPUs) may be located on at least one of: internal printed circuit boards (PCBs) and external-cloud platforms including Amazon Web Services, internal corporate cloud computing clusters, or organizational computing resources.

The one or more server platforms 400 may be a computer system such as the system 102 that may be used with the embodiments described herein. The computer system may represent a computational platform that includes components that may be in the one or more servers 108 or another computer system. The computer system may be executed by the one or more hardware processors 110 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the one or more hardware processors 110 that execute software instructions or code stored on a non-transitory computer-readable storage medium 402 to perform methods of the present disclosure. The software code includes, for example, instructions to gather data and analyze the network environment data. For example, the plurality of subsystems 114 includes the data-obtaining subsystem 206, the data processing subsystem 208, the topology detection subsystem 210, the data analyzing subsystem 212, the risk score evaluation subsystem 214, the alert generation subsystem 216, and the risk validation subsystem 218.

The instructions on the computer-readable storage medium 402 are read and stored the instructions in the storage unit or random-access memory (RAM) 404. The storage unit 204 may provide a space for keeping static data where at least some instructions could be stored for later execution. The stored instructions may be further compiled to generate other representations of the instructions and dynamically stored in the RAM 404. The one or more hardware processors 110 may read instructions from the RAM 404 and perform actions as instructed.

The computer system may further include an output device 406 to provide at least some of the results of the execution as output including, but not limited to, visual information to the one or more users, such as the administrators. The output device 406 may include a display on computing devices and virtual reality glasses. For example, the display may be a mobile phone screen or a laptop screen. GUIs and/or text may be presented as an output on the display screen. The computer system may further include an input device 408 to provide the one or more users or another device with mechanisms for entering data and/or otherwise interacting with the computer system. The input device 408 may include, for example, a keyboard, a keypad, a mouse, or a touchscreen. Each of these output devices 406 and input device 408 may be joined by one or more additional peripherals.

A network communicator 410 may be provided to connect the computer system to a network and in turn to other devices connected to the network including other entities, servers, data stores, and interfaces. The network communicator 410 may include, for example, a network adapter such as a LAN adapter or a wireless adapter. The computer system may include a data sources interface 412 to access a data source 414. The data source 414 may be an information resource about the vegetation. As an example, the one or more databases 118 of exceptions and rules may be provided as the data source 414. Moreover, knowledge repositories and curated data may be other examples of the data source 414. The data source 414 may include libraries containing, but not limited to, datasets related to network security, device configurations, historical network traffic patterns, cryptographic keys, and other essential information. Moreover, the data sources interface 412 enables the system 102 to dynamically access and update these data repositories as new information is collected, analyzed, and utilized.

In another exemplary embodiment, the system integrated with one or more artificial intelligence (AI) models to enhance the detection of the unauthorized relocations of the one or more endpoint devices 106. The one or more AI models embedded in the data-obtaining subsystem to identify anomalies or discrepancies in the obtained network environment data, flagging potential issues such as data tampering or incomplete data acquisition. The data processing subsystem leverages the one or more AI models for real-time analysis of the network environment data. The one or more AI models may be trained to recognize patterns in network traffic, such as frequent TCP payload prefixes, commonly accessed intranet domains, and SSL server names. The one or more AI models is able to adapt to evolving network conditions, refining their analysis as new data is collected.

The topology detection subsystem may employ one or more AI-driven cryptographic hash function models to generate the one or more hash values. The one or more AI-driven cryptographic hash function models ensures that the one or more hash functions is optimized for security and efficiency, adapting to different network environments and configurations. The data analyzing subsystem integrates with the one or more AI models to accurately generate the PDS for each endpoint device. The one or more AI models continuously learn from new data, improving their ability to detect subtle deviations that may signify unauthorized relocation.

Numerous advantages of the present disclosure may be apparent from the discussion above. In accordance with the present disclosure, the system facilitates real-time monitoring and detection of the unauthorized relocation of the one or more endpoint devices, providing a critical layer of security. This immediate detection helps prevent potential security breaches by enabling prompt action to mitigate threats. Using the one or more cryptographic hash function models to generate the one or more hash values for at least one of the: one or more baseline network features and one or more real-time network features, the system ensures precise network topology mapping. This accuracy is crucial in identifying any unauthorized changes or movements within the one or more network environments.

The use of one or more machine learning models allows the system to automate the unauthorized relocation assessment process by calculating the PDS. This PDS helps classify the severity level of unauthorized relocation, enabling a more efficient and automated response mechanism. The system reduces the likelihood of false positives by validating the one or more alerts with additional contextual information, such as source IP-based geolocation. This leads to more accurate and reliable threat detection, enhancing overall system efficiency. The system is configured to be scalable and adaptable to the one or more network environments, whether deployed in small-scale or large-scale networks. Its modular design, with the plurality of subsystems that may be tailored to specific network needs, ensures flexibility and ease of integration with existing security infrastructure. The system efficiently processes large volumes of network data, extracting relevant features for analysis while ensuring secure and organized storage of this data. This efficiency ensures that the system can handle the demands of real-time network monitoring without compromising performance.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A computer-implemented system for detecting unauthorized relocation of one or more endpoint devices, comprising:
   one or more network security appliances operatively positioned in each network environment of one or more network environments, configured to collect network environment data associated with each endpoint device of the one or more endpoint devices; and
   one or more servers operatively connected to each network security appliance of the one or more network security appliances, comprising:
   one or more hardware processors;
   a memory unit operatively connected to the one or more hardware processors, wherein the memory unit comprises a set of computer-readable instructions in form of a plurality of subsystems, configured to be executed by the one or more hardware processors, wherein the plurality of subsystems comprises:
   a data-obtaining subsystem configured to obtain the network environment data from the one or more network security appliances for storing in a one or more databases;
   a data processing subsystem configured to extract one or more baseline network features and one or more real-time network features by parsing the obtained network environment data into one or more tokens;
   a topology detection subsystem configured to generate one or more hash values based on the: one or more baseline network features and one or more real-time network features to determine a network topology of each endpoint device of the one or more endpoint devices;
   a data analyzing subsystem configured to perform a comparative analysis between the one or more hash values of the one or more baseline network features with the one or more hash values of the one or more real-time network features to generate a Paranoia-Diff-Score (PDS) for each endpoint device of the one or more endpoint devices using one or more machine learning (ML) models; and
   a risk score evaluation subsystem configured to compare the Paranoia-Diff-Score (PDS) against a predefined threshold score for detecting a severity level associated with the unauthorized relocation of each endpoint device of the one or more endpoint devices.

2. The computer-implemented system of claim 1, wherein the network environment data comprises at least one of: Link Layer Discovery Protocol (LLDP) neighbor data, Media Access Control (MAC) addresses, system capability codes, next hop Media Access Control (MAC) addresses, Dynamic Host Configuration Protocol (DHCP) options, Internet Service Provider Internet Protocol (IP) addresses, Internet Control Message Protocol (ICMP) traceroute data, Network Time Protocol (NTP) date and time, time zone information, gateway, and network traffic data.

3. The computer-implemented system of claim 1, wherein the one or more network security appliances configured to collect the network environment data through at least one of:
   Dynamic Host Configuration Protocol (DHCP) Server on Local Area Network (LAN) interfaces; and
   neighboring Service Set Identifiers (SSIDs), and Wireless Local Area Network (WLAN) Access Point (AP) Media Access Control (MAC) addresses on Wide Area Network (WAN) interfaces.

4. The computer-implemented system of claim 1, wherein the data processing subsystem configured to generate the one or more baseline network features during an initial configuration of the one or more network security appliances by collecting the network environment data over a predefined time interval,
   the predefined time interval for generating the one or more baseline network features ranges between 30 minutes to 2 hours after the initial configuration of the one or more network security appliances.

5. The computer-implemented system of claim 1, wherein the data processing subsystem configured to parse the obtained network environment data into the one or more tokens by analyzing the network traffic data,
   the network traffic data comprises at least one of: Transmission Control Protocol (TCP) payload prefixes, intranet domain names, and Secure Sockets Layer (SSL) server names.

6. The computer-implemented system of claim 1, wherein the topology detection subsystem configured with one or more cryptographic hash function models, the one or more cryptographic hash function models configured to convert the network environment data into a fixed-size string of characters to generate the one or more hash values for at least one of the: one or more baseline network features and one or more real-time network features.

7. The computer-implemented system of claim 1, wherein the one or more machine learning (ML) models selected from a group comprises at least one of a: Principal Component Analysis (PCA) and one or more autoencoders to generate the Paranoia-Diff-Score (PDS).

8. The computer-implemented system of claim 1, wherein the risk score evaluation subsystem configured to classify the severity level into at least one of a: default paranoia level, moderate paranoia level, and maximum paranoia level, based on the comparison between the Paranoia-Diff-Score (PDS) and the predefined threshold score.

9. The computer-implemented system of claim 1, wherein the computer-implemented system configured to cease one or more network activities of the one or more endpoint devices if the Paranoia-Diff-Score (PDS) is classified as at least one of the: moderate paranoia level, and maximum paranoia level,
the one or more network activities comprises at least one of:
suspending network traffic of the one or more endpoint devices;
disabling a network interface of the one or more endpoint devices;
removing the one or more endpoint devices from any site-to-site virtual private network (VPN) connections;
terminating one or more active network sessions associated with the one or more endpoint devices; and
rejecting one or more incoming network connections to the one or more endpoint devices.

10. The computer-implemented system of claim 1, wherein the plurality of subsystems comprises an alert generation subsystem and a risk validation subsystem,
the alert generation subsystem configured to generate one or more alerts based on the Paranoia-Diff-Score (PDS) to notify one or more users about the unauthorized relocation of the one or more endpoint devices; and
the risk validation subsystem configured to obtain confirmation data from the one or more users about the unauthorized relocation of the one or more endpoint devices if the Paranoia-Diff-Score (PDS) is classified as at least one of the: default paranoia level and moderate paranoia level.

11. The computer-implemented system of claim 1, wherein the computer-implemented system configured to utilize source IP-based geolocation information to optimize the detection of unauthorized relocation of the one or more endpoint devices.

12. A computer-implemented method for detecting unauthorized relocation of one or more endpoint devices, comprising:
collecting, by one or more network security appliances, network environment data associated with each endpoint device of the one or more endpoint devices;
obtaining, by one or more servers through a data processing subsystem, the network environment data from the one or more network security appliances to store in one or more databases;
extracting, by the one or more servers through a data processing subsystem, one or more baseline network features and one or more real-time network features by parsing the obtained network environment data into one or more tokens;
generating, by the one or more servers through a topology detection subsystem, one or more hash values based on the: one or more baseline network features and one or more real-time network features to determine a network topology of each endpoint device of the one or more endpoint devices;
performing, by the one or more servers through a data analyzing subsystem, a comparative analysis between the one or more hash values of the one or more baseline network features with the one or more hash values of the one or more real-time network features to generate a Paranoia-Diff-Score (PDS) for each endpoint device of the one or more endpoint devices using one or more machine learning (ML) models; and
comparing, by the one or more servers through a risk score evaluation subsystem, the generated Paranoia-Diff-Score (PDS) against a predefined threshold score for detecting a severity level associated with the unauthorized relocation of each endpoint device of the one or more endpoint devices.

13. The computer-implemented method of claim 12, comprising:
collecting, by the one or more network security appliances, the network environment data through at least one of:
Dynamic Host Configuration Protocol (DHCP) Server on Local Area Network (LAN) interfaces; and
neighboring Service Set Identifiers (SSIDs), and Wireless Local Area Network (WLAN) Access Point (AP) Media Access Control (MAC) addresses on Wide Area Network (WAN) interfaces.

14. The computer-implemented method of claim 12, wherein extracting the one or more baseline network features comprises:
generating, by the one or more network security appliances, the one or more baseline network features during an initial configuration of the one or more network security appliances by collecting the network environment data over a predefined time interval,
the predefined time interval for generating the one or more baseline network features ranges between 30 minutes to 2 hours after the initial configuration of the one or more network security appliances.

15. The computer-implemented method of claim 12, wherein parsing the obtained network environment data into the one or more tokens comprises analyzing the network traffic data,
the network traffic data comprises at least one of: Transmission Control Protocol (TCP) payload prefixes, intranet domain names, and Secure Sockets Layer (SSL) server names.

16. The computer-implemented method of claim 12, wherein generating the one or more hash values comprises:
using one or more cryptographic hash function models to convert the network environment data into a fixed-size string of characters to generate the one or more hash values for at least one of the: one or more baseline network features and one or more real-time network features.

17. The computer-implemented method of claim 12, wherein generating the Paranoia-Diff-Score (PDS) comprises:

using at least one of a Principal Component Analysis (PCA) and one or more autoencoders as the one or more machine learning (ML) models; and classifying, by the one or more servers through the risk score evaluation subsystem, the severity level into at least one of a: default paranoia level, moderate paranoia level, and maximum paranoia level, based on the comparison between the Paranoia-Diff-Score (PDS) and the predefined threshold score.

18. The computer-implemented method of claim 12, comprising:

ceasing, by the one or more servers through the risk score evaluation subsystem, one or more network activities of the one or more endpoint devices if the Paranoia-Diff-Score (PDS) is classified as at least one of the: moderate paranoia level, and maximum paranoia level, the one or more network activities comprises at least one of:
  suspending network traffic of the one or more endpoint devices;
  disabling a network interface of the one or more endpoint devices;
  removing the one or more endpoint devices from any site-to-site virtual private network (VPN) connections;
  terminating one or more active network sessions associated with the one or more endpoint devices; and
  rejecting one or more incoming network connections to the one or more endpoint devices.

19. The computer-implemented method of claim 12, comprising:

generating, by the one or more servers through an alert generation subsystem, one or more alerts based on the Paranoia-Diff-Score (PDS) to notify one or more users about the unauthorized relocation of the one or more endpoint devices; and obtaining, by the one or more servers through a risk validation subsystem, confirmation data from the one or more users about the unauthorized relocation of the one or more endpoint devices if the Paranoia-Diff-Score (PDS) is classified as at least one of the: default paranoia level and moderate paranoia level.

20. A non-transitory computer-readable storage medium storing computer-executable instructions that, when executed by one or more servers, cause the one or more servers to perform operations for detecting unauthorized relocation of one or more endpoint devices, the operations comprising:

collecting network environment data associated with each endpoint device of the one or more endpoint devices;

obtaining the network environment data from the one or more network security appliances for storing in one or more databases;

extracting one or more baseline network features and one or more real-time network features by parsing the obtained network environment data into one or more tokens;

generating one or more hash values based on the: one or more baseline network features and one or more real-time network features to determine a network topology of each endpoint device of the one or more endpoint devices;

performing a comparative analysis between the one or more hash values of the one or more baseline network features with the one or more hash values of the one or more real-time network features to generate a Paranoia-Diff-Score (PDS) for each endpoint device of the one or more endpoint devices using one or more machine learning (ML) models; and comparing the generated Paranoia-Diff-Score (PDS) against a predefined threshold score for detecting a severity level associated with the unauthorized relocation of each endpoint device of the one or more endpoint devices.

\* \* \* \* \*